United States Patent [19]

Surles

[11] Patent Number: 4,903,510
[45] Date of Patent: Feb. 27, 1990

[54] VEHICLE ANTITHEFT DEVICE

[76] Inventor: Keanen T. Surles, 314 W. 150th Pl., Harvey, Ill. 60426

[21] Appl. No.: 286,962

[22] Filed: Dec. 20, 1988

[51] Int. Cl.⁴ .............................................. F16H 57/00
[52] U.S. Cl. ......................................... 70/202; 70/256
[58] Field of Search ................. 70/201, 202, 203, 253, 70/254, 255, 256, 257

[56] References Cited

U.S. PATENT DOCUMENTS

| 1,260,051 | 3/1918 | Reiser . | |
| 1,271,941 | 7/1918 | Reiser | 70/202 |
| 1,764,383 | 6/1930 | Bezek . | |
| 2,471,293 | 5/1939 | Truesdell | 70/202 |
| 4,488,417 | 12/1984 | Werner | 70/253 |

FOREIGN PATENT DOCUMENTS

| 0086087 | 8/1983 | European Pat. Off. . | |
| 509248 | 4/1920 | France | 70/202 |
| 54940 | 11/1950 | France | 70/201 |

Primary Examiner—Robert L. Wolfe
Attorney, Agent, or Firm—Reising, Ethington, Barnard, Perry & Milton

[57] ABSTRACT

A vehicle antitheft device (10) for locking the brakes of a vehicle including a hook member (12) which engages the brake pedal (16) of a vehicle. The hook member (12) is locked (11) through the floorboard (20) by a dead bolt (24) which slides through a guide hole (23) in a locking sleeve (18) which depends from the floorboard (20). The dead bolt (24) further extends through a hole (22) in the shaft (13) of the hook member (12) while the shaft (13) is inside the locking sleeve (18). The dead bolt (24) is engaged by a key-operated push-pull cable (26,28). A brake light cutoff switch (34) is included to prevent brake light operation when the device is in the locked position. A metal box (38) encloses the locking mechanism (11) to protect the system from tampering from underneath the vehicle.

30 Claims, 1 Drawing Sheet

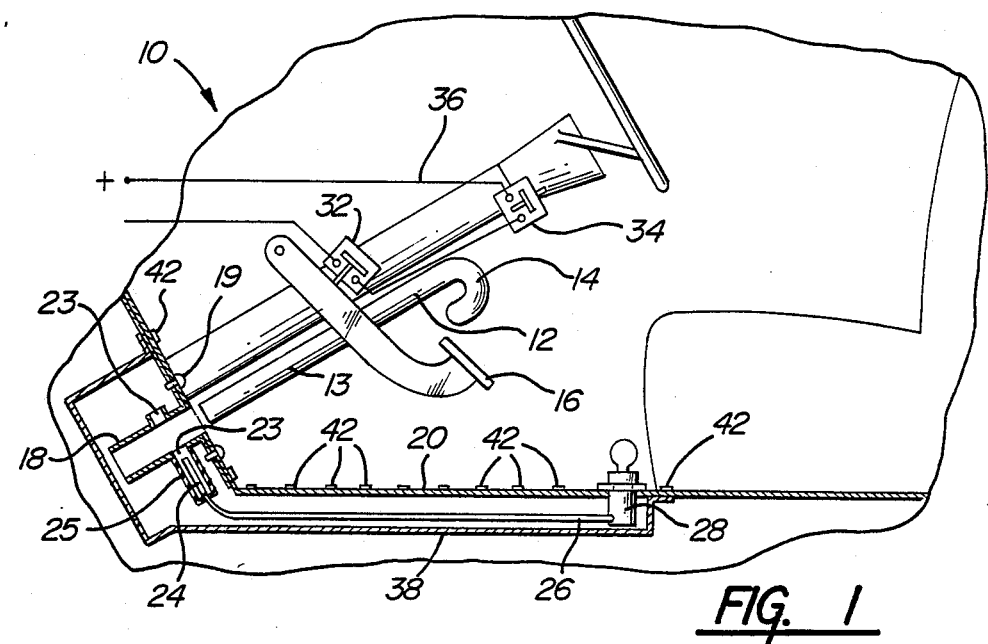
FIG. 1
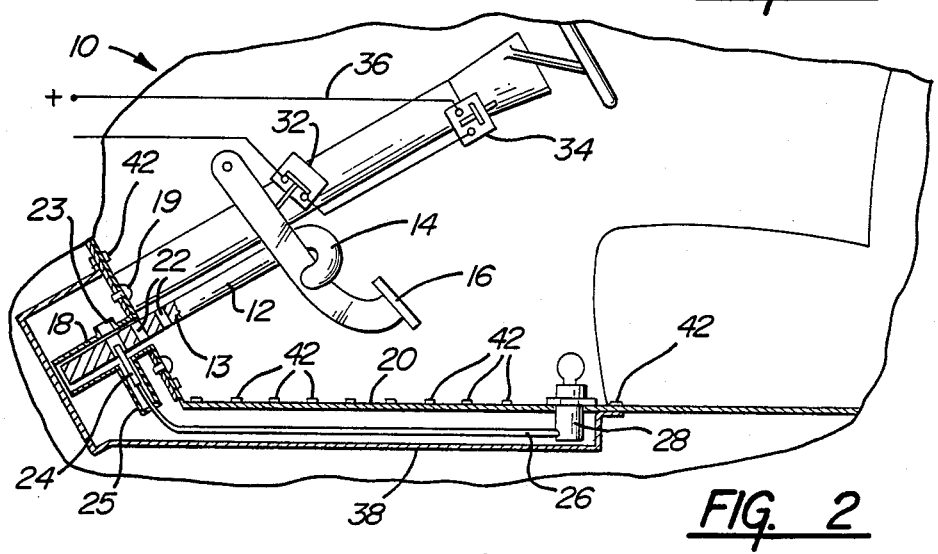
FIG. 2
FIG. 3
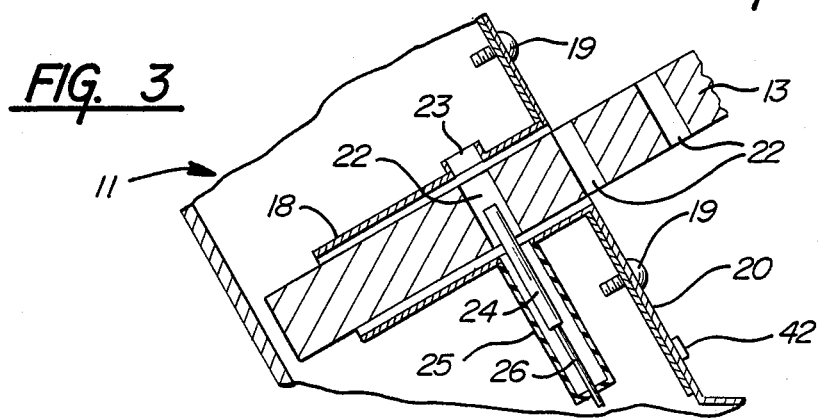

VEHICLE ANTITHEFT DEVICE

TECHNICAL FIELD

The subject invention relates to a vehicle antitheft device which mechanically locks a brake system in a brakes-on position. More specifically, the instant invention relates to the use of a brake pedal engaging mechanism which locks the brake pedal of a vehicle towards the floorboard in a brakes-on position and which does not interfere with safe operation of the brakes when the locking system is not engaged.

BACKGROUND ART

Prior art vehicle antitheft devices have included steering column locks, burglar alarms, ignition lock guards, hood locks, brake lock devices and hooking mechanisms which engage the steering wheel and brake pedal. These devices have been unsuccessful in stopping thieves because these systems can be removed easily or bypassed in a short period of time. For instance, alarm systems can be easily bypassed by an experienced thief in about one minute or less and the system which hooks the brake pedal and steering wheel can be easily pried loose in less than one minute.

The brake-locking mechanisms in the past have not been effective because they have interfered with the safe operation of the brakes.

As an example, U.S. Pat. No. 1,972,300 issued to Hemingway, Jr. on Sept. 4, 1934 teaches a brake-lock mechanism hidden underneath the floorboard which is locked by means of a ratcheting pawl which engages locking slots in the locking shaft, which locking shaft is operatively connected to the brake pedal. In this Hemingway patent, the lock is disengaged by the energizing of an electromagnet which pulls the locking pawl out of engagement with the locking shaft. It is evident upon examination of this mechanism that a failure of the electromagnet disengaging system would result in an unsafe brake lockup and would, therefore, interfere with safe brake operation.

Also known to the prior art is the brake locking mechanism of U.S. Pat. No. 1,516,482 issued to Gray on Nov. 18, 1924. While the Gray '482 mechanism would not interfere with safe operation of the brakes, the locking mechanism is easily circumvented by either "prying" the brake pedal engaging means loose or by breaking the lock. Either method could easily be accomplished due to the easy accessibility of the system from the vehicle interior.

The U.S. Pat. No. 1,260,051 to Reiser, issued Mar. 19, 1918 discloses a locking assembly for motor vehicles. The assembly includes a brake or clutch pedal to which a locking shaft is fixedly secured. The other end of the locking shaft extends through the vehicle floor and is slideably supported within an opening of a base plate located away from the vehicle floor. A plunger having bars thereon is actuated and the bars engage openings in the locking shaft to prevent movement of the locking shaft. This patent is most deficient in that the locking shaft is fixed to the brake pedal and cannot be removed. This may cause inadvertent locking of the brakes during operation of the vehicle.

The European Patent Application No. 0,086,087 filed Mar. 2, 1983 discloses an antitheft device for automotive vehicles. This application shows a "J" hook member. The shaft is supported by locking member. The shaft has a plurality of ratcheting teeth thereon. The base of the shaft engages the vehicle floor. When the device is locked, the purpose of the "J" hook is to prevent application of brakes.

The U.S. Pat. No. 1,764,383 to Bejek, issued June 17, 1930 discloses a device for locking a vehicle clutch a brake in the engaged position. This patent shows a shaft which is fixedly secured at one end to a brake pedal below the floorboard. The opposite end of the shaft is slideably retained in a housing. The shaft has a plurality of teeth thereon for locking the shaft within the housing for locking the brake or clutch pedal in the engaged position.

STATEMENT OF THE INVENTION AND ADVANTAGES

According to the present invention there is provided a vehicle antitheft assembly including a brake pedal engaging means for engaging the brake pedal above the floorboard and retaining the brake pedal in a brake-engaged position. A locking means for receiving the brake pedal engaging means is disposed below the floorboard of a vehicle and at a position aligned with the brake pedal. The locking means locks the pedal engaging means in the brake engaged position.

The advantage of this system over the prior art is that the pedal engaging means cannot be "pried" loose because the only exposed portion is between the floorboard and the brake pedal and, therefore, a "pry bar" longer than the vehicle itself would be necessary to provide enough leverage to break the pedal-engaging means. In addition, the locking mechanism is hidden below the floorboard to provide further tamper resistance.

A second advantage is that the pedal-engaging means can be removed free from the braking system and does not interfere with the safe operation of the braking system.

A third advantage is that to remove the present assembly would take forty-five minutes to one hour using cutting torches. This time factor discourages the theft of the automobile because a thief does not have forty-five minutes in which to remove the system and would therefore be inclined to move on to another vehicle.

FIGURES IN THE DRAWINGS

Other advantages of the present invention will be readily appreciated as the same becomes better understood by reference to the following detailed description when considered in connection with the accompanying drawings wherein:

FIG. 1 is a schematic view of a vehicle antitheft assembly in the unlocked position;

FIG. 2 is a schematic view of an assembly in the locked position; and

FIG. 3 is a fragmentary cross-sectional view of the locking mechanism.

DETAILED DESCRIPTION OF THE DRAWINGS

A vehicle antitheft assembly of the type for locking the brakes in a brake-engaged position is generally shown at 10. As shown in FIG. 1, the assembly 10 includes a brake pedal engaging means 12 comprising a locking hook member 12 having a curved portion 14 in the form of a "J" shaped hook 14 with a depending shaft portion 13. The locking hook member 12 is independent from the vehicle brake pedal 16. That is, the hook member 12 is not fixed to the pedal 16. When the assembly 10 is actuated, the brake pedal 16 is engaged by the hook portion 14 which holds the brake pedal 16 toward the floorboard 20 by a locking means generally shown at 11 in FIG. 3. More specifically, locking means 11 includes a shaft portion 13 having a series of locking holes 22. The shaft portion 13 fits into a sleeve 18 depending from the floorboard and having a guide hole 23 which sleeve 18 is permanently mounted through the floorboard 20 of a vehicle using any suitable fasteners 19. That is, the sleeve 18 extends downwardly from the floorboard 20. This provides retention of the shaft portion 13 immediately below the floorboard 20. A dead bolt 24 is slideably mounted so that it passes through and engages the shaft portion 13 of the hook member 12 within the sleeve 18. The dead bolt 24 is slideably engaged by push-pull cable 26 operated by a keyed lock 28. The bolt 24 is slideably supported in sleeve or cylinder 25.

A brake light cutoff means 34 is employed so that when the mechanism is locked in the brake-engaged position, the brake lights do not remain on and, therefore, will not run down the battery. More specifically, a cutoff switch 34 is wired into the power line 36 of the brake light switch 32. This cutoff switch 34 can be operated manually or may be placed such that it operates in response to the assembly being engaged, i.e., a linkage or electrical interconnect.

The assembly also has armor plating means 38 to protect the exposed elements of the locking means 11. More specifically, the armor plating means includes a metal box 38 or a plurality of metal boxes which surround the locking means 11 and push-pull cable assembly 26 and 28. The box is attached to the floorboard 20 of the vehicle using a large number of fasteners, such as rivets, or the box may even be welded. The use of a large number of fasteners provides further time-consuming tamper resistance.

In operation, the hooked portion 14 of the locking hook member 12 is placed over the brake pedal or brake pedal shaft 16. The shaft portion 13 is then moved into the sleeve 18 directly below the floorboard. The brake pedal 16 and the locking hook member 12 are moved in response to a manual force applied to the brake pedal 16 to the full braking position (as shown in FIG. 2). As one of the locking holes 22 aligns with the guide hole 23, the key lock 28 is actuated by turning the key. The push-pull cable 26 engages the dead bolt 24 which extends through the guide hole 23 and the locking hole 22 in the shaft portion 13 of the brake pedal engagement means 12 and the cutoff switch 34 is opened. The push-pull cable 26 is moved in response to the key lock 26 being actuated. This movement causes the dead bolt 24 to move through the guide hole 23 and into the locking hole 22. This prevents movement of the locking hook member 12 thereby locking the brake pedal 16 in the engaged position.

To restore normal operation of the brakes, the key is turned in the key lock 28 and the push-pull cable 26 retracts the dead bolt 24 from the locking hole 22. The locking hook member 12 is manually removed and the cutoff switch 34 is placed in the closed position. By removing the locking hook member 12, normal operation of the brake pedal 16 is achieved without any interference of the antitheft assembly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicle antitheft device assembly (10) comprising:
   a floor board (20);
   a brake pedal (16);
   brake pedal engaging means (12) including a shaft portion (13) and a J-hook end portion (14) for engaging a brake peal (16) above the floor board (20) and retaining the brake pedal (16) in a brake-engaged position (FIG. 2) and for being disengaged and independent from said brake pedal (16) when not in the brake engaged position;
   locking means (11) depending from said floor board (20) for receiving said shaft portion (13) of said brake pedal engaging means (12) below the floorboard (20) of the vehicle at a position aligned with said brake pedal (16) and for locking said brake pedal engaging means (12) in the brake-engaged position (FIG. 2).

2. The antitheft assembly of claim 1 wherein said shaft portion (13) includes a series of locking holes (22) extending through said shaft portion (13), said locking means including a guide hole (23) and a bolt means (24) slideably mounted through said guide hole (23) and one of said locking holes (22) in said shaft portion (13) for selectively locking said shaft portion (13) within said locking means (11).

3. The antitheft assembly of claim 2 wherein said locking means (11) includes a push-pull cable (26) and said bolt means includes a dead bolt 24, said push-pull cable (26) having a first end operatively connected to said dead bolt (24) for moving said dead bolt (24) into locking engagement with one of said locking holes (22) in said shaft portion (13).

4. The antitheft assembly of claim 3 wherein said locking means (11) includes a key-operated lock (28), said push-pull cable (26) including a second end and operatively connected to said key-operated lock (28).

5. The antitheft assembly of claim 4 wherein said locking means (11) includes a sleeve (18) permanently mounted by fastening means (19) through said vehicle floorboard (20) and depending therefrom for receiving said shaft portion (13).

6. The antitheft assembly of claim 5 including armor plating means (38) for providing an armor enclosure for said locking means (11).

7. The antitheft assembly of claim 6 wherein said armor plating means includes a metal box (38) for enclosing said locking means (11) exposed underneath said floorboard (20).

8. The antitheft assembly of claim 7 including fastening means (42) for fastening said metal box (38) to said floorboard (20).

9. The antitheft assembly of claim 8 wherein said fastening means (42) includes rivets.

10. The antitheft assembly of claim 9 including a multiplicity of said fastening means (42) to increase the time necessary to remove said metal box (38).

11. The antitheft assembly of claim 6 including brake light cutoff means (34) for turning off the brake lights when the assembly is in said brake-engaged position (FIG. 2).

12. The antitheft assembly of claim 11 wherein said brake light cutoff means (34) includes a manual switch.

13. The antitheft assembly of claim 11 wherein said brake light cutoff means (34) includes an automatic switch.

14. The antitheft assembly of claim 6 wherein said armor plating means (38) includes at least one metal box.

15. A vehicle antitheft assembly (10) comprising:
   brake pedal engaging means (12) for engaging a brake pedal (16) above a floor board (20) and retaining the brake pedal (16) in a brake-engaged position and for being disengaged and independent from the brake pedal (16) when not in the brake-engaged position;
   locking means (11) for receiving said brake pedal engaging means (12) below the floor board (20) of a vehicle at a position aligned with the brake pedal (16) and for locking said pedal engaging means (12) in the brake-engaged position.

16. The antitheft assembly of claim 15 wherein said pedal engaging means (12) includes a shaft portion (13), said locking means (11) receiving and engaging said shaft portion (13) to lock the brake pedal (16) in the brake engaged position.

17. The antitheft assembly of claim 16 wherein said shaft portion (13) includes a series of locking holes (22) extending through said shaft portion (13), said locking means including a guide hole (23) and a bolt means (24) slideably mounted through said locking holes (22) in said shaft portion (13) for selectively locking said shaft portion (13) within said locking means (11).

18. The antitheft assembly of claim 17 wherein said locking means (11) includes a push-pull cable (26) having a first end operatively connected to said dead bolt (24) for moving said dead bolt (24) into locking engagement with one of said locking holes (22) in said shaft portion (13).

19. The antitheft assembly of claim 18 wherein said locking means (11) includes a key-operated lock (28), said push-pull cable (26) including a second end and operatively connected to said key-operated lock (28).

20. The antitheft assembly of claim 19 wherein said brake pedal engaging means (12) includes "J" hook end portion (14) for engaging the brake pedal (16).

21. The antitheft assembly of claim 20 wherein said locking means (11) includes a sleeve (18) permanently mounted by fastening means (19) through the vehicle floorboard (20) for receiving said shaft portion.

22. The antitheft assembly of claim 21 including armor plating means (38) for providing an armor enclosure for said locking means (11).

23. The antitheft assembly of claim 22 wherein said armor plating means includes a metal box (38) for enclosing said locking means (11) exposed underneath the floorboard (28).

24. The antitheft assembly of claim 23 including fastening means (42) for fastening said metal box (38) to the floorboard (20).

25. The antitheft assembly of claim 24 wherein said fastening means (42) includes rivets.

26. The antitheft assembly of claim 25 including a multiplicity of said fastening means (42) to increase the time necessary to remove said metal box (38).

27. The antitheft assembly of claim 22 including brake light cutoff means (34) for turning off the brake lights when said assembly is in the brake-engaged position (FIG. 2).

28. The antitheft assembly of claim 27 wherein said brake light cutoff means (34) includes a manual switch.

29. The antitheft assembly of claim 27 wherein said brake light cutoff means (34) includes an automatic switch.

30. The antitheft assembly of claim 29 wherein said armor plating means (38) includes at least one metal box.

* * * * *